United States Patent [19]

Aoyagi et al.

[11] 4,326,789
[45] Apr. 27, 1982

[54] INTERCHANGEABLE LENS ASSEMBLY FOR A CAMERA

[75] Inventors: Masao Aoyagi, Yokohama; Shigeru Kamata, Tokyo, both of Japan

[73] Assignee: Canon Kabushiki Kaisha, Tokyo, Japan

[21] Appl. No.: 236,016

[22] Filed: Feb. 19, 1981

[30] Foreign Application Priority Data

Feb. 27, 1980 [JP] Japan .................................. 55-23695

[51] Int. Cl.³ ........................ G02B 7/02; G03B 17/00; G03B 9/02
[52] U.S. Cl. .................................. 354/286; 350/255; 354/272
[58] Field of Search ............... 354/286, 195, 196, 232, 354/272; 350/252, 255, 257

[56] References Cited

U.S. PATENT DOCUMENTS

| | | | |
|---|---|---|---|
| 1,734,438 | 11/1929 | Koehler | 350/255 |
| 2,536,500 | 1/1951 | Hinden | 350/255 X |
| 3,071,057 | 1/1963 | Gebele | 354/232 |
| 3,906,534 | 9/1975 | Shirasaki | 354/286 |
| 3,968,504 | 7/1976 | Komine | 354/286 X |
| 4,003,068 | 1/1977 | Hashimoto et al. | 354/286 |

FOREIGN PATENT DOCUMENTS

2805210 8/1978 Fed. Rep. of Germany ...... 354/272

*Primary Examiner*—Donald A. Griffin
*Attorney, Agent, or Firm*—Toren, McGeady & Stanger

[57] ABSTRACT

An interchangeable lens assembly for a camera is formed in two parts with the first part being removably attachable to the camera body and the second part being removably attachable to the first part. A diaphragm mechanism is arranged in the second part of the assembly and diaphragm control arms extend through the first part of the assembly into operative connection with the camera. Various operative modifications of the lens assembly are possible and because of the bipartite structure of the lens assembly, greater versatility with regard to interchangeability of operative components is facilitated.

6 Claims, 6 Drawing Figures

INTERCHANGEABLE LENS ASSEMBLY FOR A CAMERA

The present invention relates generally to camera systems and, more particularly, to an interchangeable lens assembly for a camera. The invention is specifically directed to the structure of an interchangeable lens assembly which is formed in two parts with a front barrel section and a rear barrel section.

In lens assemblies of the prior art of the type to which the present invention relates, there has been provided a combination lens including a front and a rear part interchangeably mountable upon a camera. Conventional mounting systems for such interchangeable lenses tend to be of the type wherein one barrel portion is permanently affixed to the camera body and may be assembled with the other portion by a screw-threaded connection mechanism. Since the fixed barrel portion is not freely detachable from the camera body, the number of combinations of lens components possible is largely limited.

A further disadvantage of this type of device is the fact that a screw-threaded connection must be used in coupling the two lens barrel portions with each other. As the screw thread wears out, shift of the relative angular positions between the components of the lens assembly will occur and the accuracy of exposure control from one barrel portion to the other, or from the camera body to the overall lens assembly, will be adversely affected.

One type of coupling device which is available for connecting lens assembly components is the bayonet type of coupling. In an interchangeable lens assembly utilizing this type of coupling, it is generally required that the entire assembly rotate relative to the camera body when attachment or detachment is to be effected. The necessity for such rotative action gives rise to alternate problems in that the position of the attachment reference plane of the lens mounting unit with the camera body is not always capable of being accurately determined and it is thus difficult to assure the required accuracy of adjustment in positioning of signal members for the unit which must be placed in operative connection with control members in the camera body. Furthermore, the complexity and structure of the lens mounting mechanism is necessarily increased.

In an attempt to eliminate problems which have arisen in bayonet-type coupling devices, there has been developed a so-called spigot-type of bayonet coupling. In this type of coupling, rotation of the entire lens assembly is not necessary and the device is constructed so that the lens assembly may be attached with the camera body by rotation only of a tightening ring which has the bayonet or screw-threaded coupling device arranged thereon. Such a tightening ring is normally located at the rear end of the lens assembly which contains the lens optical system, the diaphragm device, the diaphragm presetting mechanism, and the diaphragm activating mechanism. When such a lens assembly is to be attached to the camera body, the lens assembly is maintained stationary and only the tightening ring is rotated. As a result, the reference surface for attachment to the camera will not be damaged by abrasion due to frictional contact caused by rotation thereof, and optical performance is not distorted. However, since the tightening ring is located in a narrow space adjacent the camera body itself, it becomes difficult to effect rapid and easy attachment and detachment of the lens assembly because of the necessity of gripping and rotating the tightening ring which tends to be relatively narrow in width.

In order to overcome this drawback, a new mechanism has been proposed for use in a bayonet-type coupling device equipped with a lens mounting system. In such a mechanism, there is provided an adapter member which is restrained from rotation relative to the camera body during attachment and detachment of the lens assembly. This mechanism is arranged so that any of the elements of the lens assembly, including the main support tube, may be rotated relative to the adapter member and relative to the camera body in order to rotate the lens-side bayonet coupling member for attachment with the camera. As a result, a reference surface may be located on the adapter member and may be held stationary, thereby avoiding frictional contact which would otherwise cause wear. Before the lens is attached to the camera body, the adapter member and the lens barrel means are set in a particular relative position and the signal member for transmitting exposure control signals between the camera and the lens assembly is held in a predetermined position relative to the adapter member. When the lens assembly is to be attached to the camera body, the operator may rotate any part of the lens assembly including the lens barrel by grasping either the main support tube, the focusing ring, or the diaphragm setting ring, whereby the bayonet coupling between the lens assembly and the camera body may be operatively connected.

The present invention is related to the aforementioned new type of mechanical mounting system for an interchangeable lens assembly wherein an adapter member is held stationary relative to the camera body while the other parts of the lens assembly may be rotated to effect coupling.

In accordance with the invention, the entire lens assembly may be composed by two parts, with one part being adapted for attachment directly to the camera body and with the second part being adapted for attachment to the first part. The diaphragm device, the diaphragm presetting ring, signal transmitting members and the entire lens system may be contained in one of the two lens barrel components or they may be distributed through both parts of the lens assembly. Thus, various combinations of the first and the second lens parts may be provided and interchangeable lens assemblies of different optical ratings may be obtained.

SUMMARY OF THE INVENTION

Briefly, the present invention may be described as an interchangeable lens assembly for a camera comprising first lens barrel means and second lens barrel means. The first lens barrel means may include: first component means or adapter means and first coupling means adapted to engage complementary coupling means on the camera for mounting the first lens barrel means on the camera; second component means mounted with the first component means and arranged to be rotatable relative thereto, said first and second component means being held in a predetermined position relative to each other when the first component means is detached from the camera; signal transmission means including a signal transmission member for transmission of exposure control signals between the lens assembly and the camera; and retainer means adapted to cooperate with complementary retainer means on the camera to maintain the first component means rotatably fixed relative to the camera during mounting of the first lens barrel means on the camera.

The second lens barrel means may include: third component means and second coupling means adapted to engage complementary coupling means on the first lens barrel means for mounting the second lens barrel means on the first lens barrel means; means for controlling the quantity of light entering the camera through the lens assembly; exposure value sensing means rotatably mounted on the second lens barrel means; and connecting means for connecting the signal transmission means and the exposure value setting means.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENT

Figures 1A, 1B:
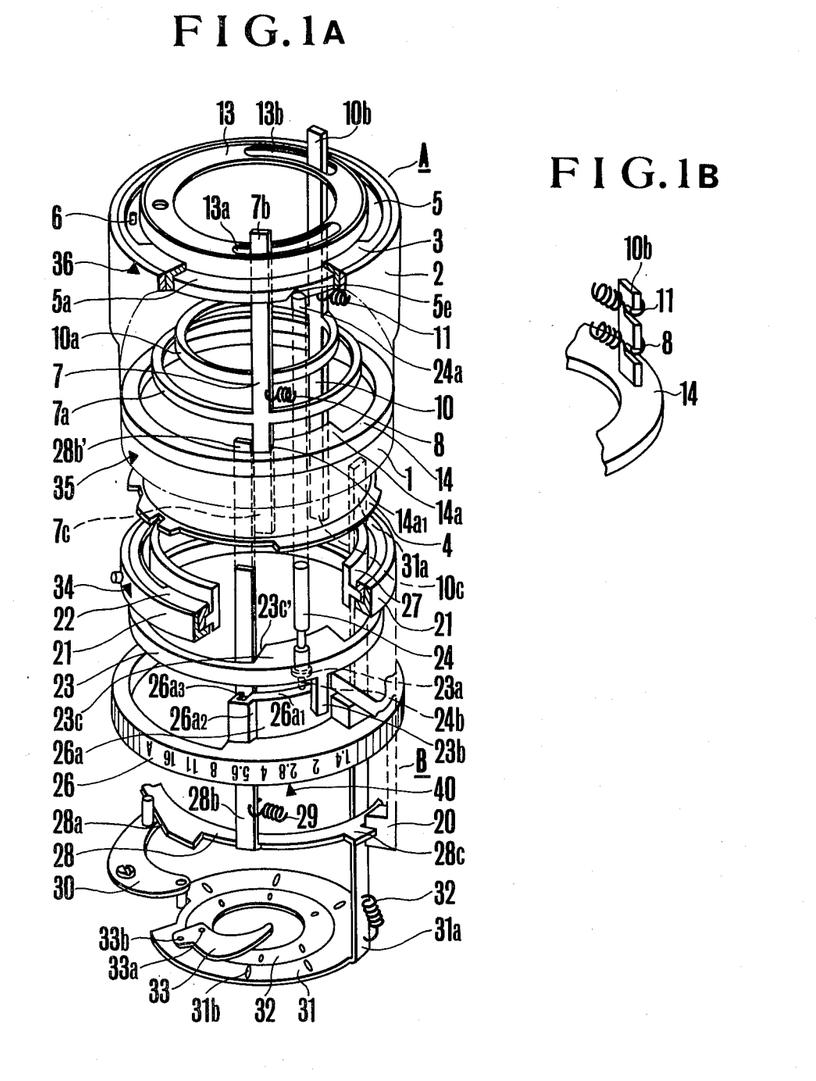
FIG. 1 is an exploded perspective view of one embodiment of the invention.

Referring now to the drawings wherein like reference numerals are used to refer to similar parts throughout the various figures thereof, there is shown, particularly in FIG. 1, an interchangeable lens assembly in accordance with the present invention which is essentially composed of first lens barrel means A and second lens barrel means B. In FIG. 1, the lens assembly is shown in its position detached from the camera body. The first lens barrel means A includes a first cylindrical member 1 which essentially constitutes the lens barrel of the first lens barrel means A and which has fixedly attached thereto a bayonet holder 2 upon which a bayonet member 3 is affixed. The bayonet member 3 is operative to attach the first lens barrel means A with a camera body by engagement with complementary bayonet means 39 (see FIG. 5) located on the camera body.

At the opposite end of the first lens barrel means A there is provided a second bayonet coupling member 4 which operates to enable coupling of the second lens barrel means B with the first lens barrel means A by engagement of the bayonet coupling means 4 with a cooperative or complementary bayonet coupling member 22 located on the second lens barrel means B.

Adapter means in the form of an annular member 5 are provided on the first lens barrel means A. The adapter means 5, in a manner to be more fully described hereinafter, are held rotatably fixed relative to the lens barrel 1 when the lens assembly is detached from a camera, with the adapter means 5 and the lens barrel 1 being rotatable relative to each other during attachment and detachment operation. The first lens barrel means A may thus be considered to comprise first component means which may include the lens barrel 1, the bayonet holder ring 2, and the bayonet member 3, all of which are made rotatable relative to the adapter ring 5, which may be considered second component means of the first lens barrel means A.

Figure 3A:
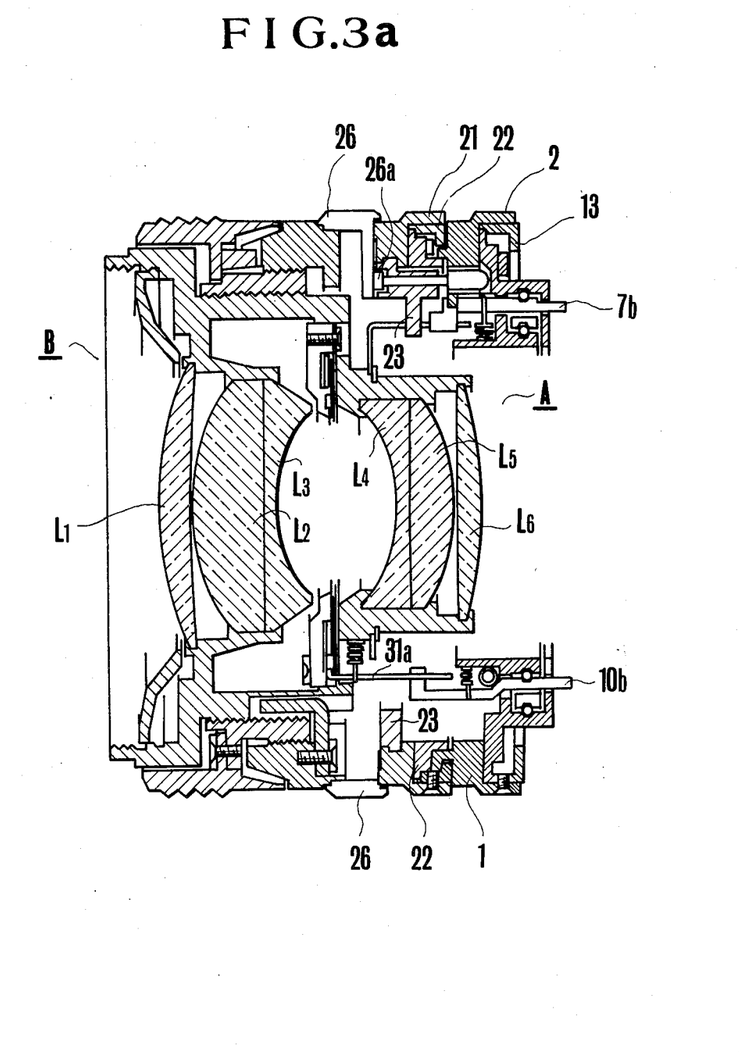
FIGS. 3(a) and 3(b) are longitudinal sectional views of different arrangements of a lens assembly structured in accordance with the invention.
Figure 3B:
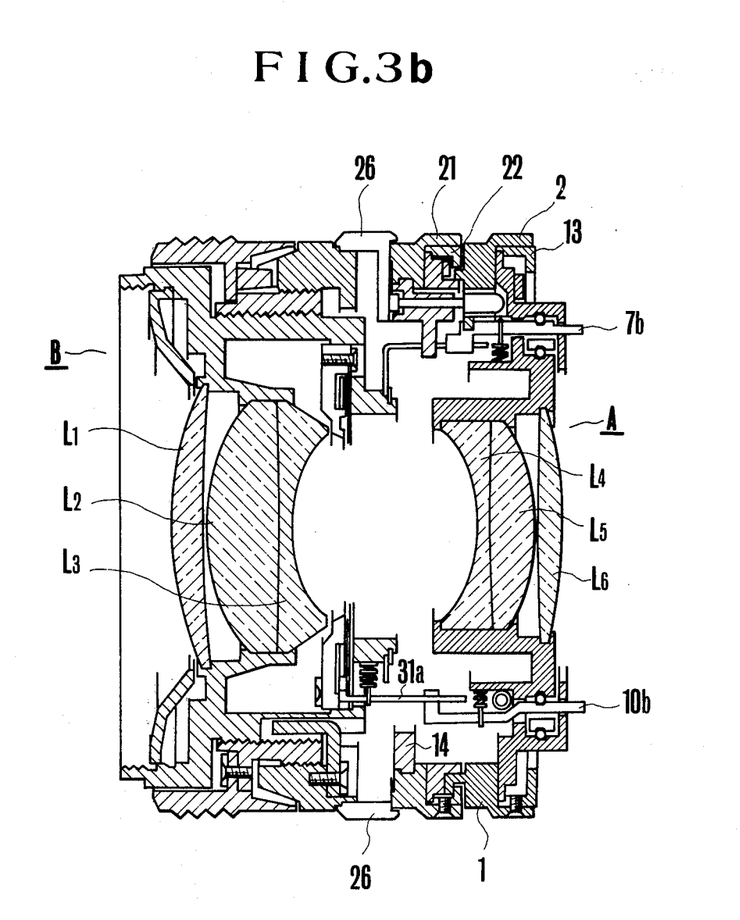

The adapter ring 5 is formed with a reference surface 5a which is in contact with a reference surface of the camera housing when the lens assembly is attached with the camera. The reference surface 5a is formed with a projection 6 mounted thereon which is adapted to be engaged in a cutout portion 39a (FIG. 5) formed in the camera in order thereby to hold the adapter ring 5 rotatively fixed relative to the camera during mounting operation. The adapter ring 5, as will be best seen from the sectional views of FIGS. 3(a) and 3(b) is formed with an outer cylindrical portion 5b and an inner cylindrical portion 5c and is constructed in a unitary manner. A diaphragm signal transmitting member 7 is provided which includes an annular portion 7a and arm portions 7b and 7c which extend forwardly and rearwardly, respectively, from the annular portion 7a. The signal transmitting member 7 is urged to rotate about the optical axis of the lens assembly in a counterclockwise direction by a spring 8 which is held in tension between the member 7 and the lens barrel 1.

The annular portion 7a of the signal transmitting member 7 is fitted in the inner diameter of the outer cylindrical portion 5b of the adapter ring 5 and is formed with a circumferential groove having a generally V-shaped cross section for holding bearing balls 9 on the opposed surfaces of the annular portion 7a and outer cylindrical portion 5b.

The bearing balls 9 operate to enable rotation of the signal transmitting member 7 about the optical axis of the lens assembly.

The lens assembly is also provided with a diaphragm actuating member 10 which operates to transmit a drive force for actuating a diaphragm mechanism in the lens assembly, this operation to be described more fully hereinafter. The actuating member 10 includes an annular portion 10a and arm portions 10b and 10c which extend forwardly and rearwardly, respectively, from the annular portion 10a. The actuating member 10 is urged to rotate about the optical axis in a clockwise direction by a spring 11 which is engaged between the member 10 and the lens barrel 1. The actuating member 10 is formed with a circumferential groove having a generally V-shaped cross section for holding therein bearing balls 12 which are also engaged with the inner cylindrical portion 5c of the adapter ring 5 located in opposed relationship with the V-shaped groove so that the actuating member 10 may be mounted by the bearing balls 12 for rotation about the optical axis of the lens assembly.

A rear cover member 13 is also provided for covering the rear open end surface of the adapter ring 5.

The signal transmitting member 7 has one of its ends 7b arranged to extend through an arcuate slot 13a. The actuating member 10 is arranged with one of its arms 10b extending through an arcuate slot 13b, with the arm 10b being adapted to be pressed against one end of the slot 13b by the spring 11 which operates to hold the actuating member 10 in a predetermined position relative to the first lens barrel means A.

A sleeve 14 is affixed on the inner diameter of the lens barrel member 1 and a projected portion 14a extending radially inwardly of the lens assembly is provided on the inner peripheral surface of the sleeve 14. The projected portion 14a is formed with an end $14a_1$ against which the arm 7c of the signal transmitting member 7 is urged by operation of the spring 8.

As previously mentioned, the adapter ring 5 and the balance of the components of the first lens barrel means A, including the lens barrel 1, are maintained fixed relative to each other when detached from the camera. However, during attachment with the camera or detachment therefrom, these elements are made rotatable relative to each other while the adapter ring 5 is held rotatably fixed relative to the camera. This mode of operation is enabled by an interlocking mechanism operative between the adapter ring 5 and the lens barrel 1 which is best seen in FIG. 4.

As seen therein, the interlocking mechanism is formed to include a lock pin 16 which is mounted in a hole 5d extending through the attachment reference surface 5a of the adapter ring 5. A spring 17 is arranged in a hole 2a which is adapted to be placed in alignment with the hole 5d when the lens assembly is detached from the camera. A push pin 18 is also provided which extends between the hole 5d and the hole 2a when the lens assembly is detached from the camera in order to hold the adapter ring 5 and the lens barrel 1 rotatably fixed relative to each other.

Figure 4:
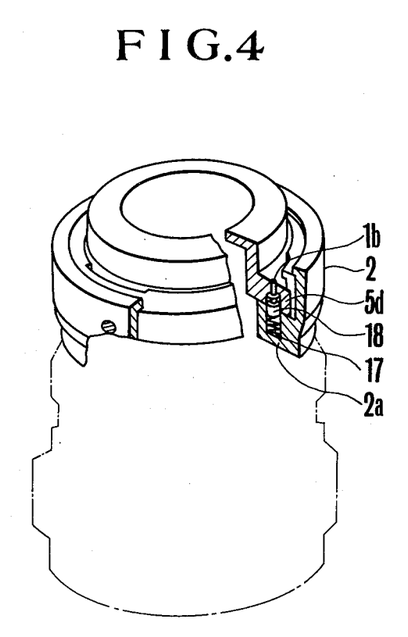
FIG. 4 is a partial perspective sectional view showing in greater detail parts of the invention.

Thus, the operation of the interlocking mechanism depicted in FIG. 4 is such that when the first lens barrel means A is detached from the camera body and is in the position depicted in FIG. 1, the hole 5d of the adapter ring 5 will be aligned with the hole 2a of the bayonet holder ring 2 (which is essentially part of the lens barrel 1 and which is affixed relative thereto) and the push pin 18 and the lock pin 16 will be spring biased toward the camera by the spring 17 with the push pin 18 thus extending between both members in order to inhibit relative rotation therebetween. Therefore, with the first lens barrel means A detached from the camera, the signal transmitting member 7 will be urged by the spring 8 into abutting engagement with the end $14a_1$ of the projected portion 14a and the arm 10b of the actuating lever 10 will be urged by the spring 11 into abutting engagement with one end of the arcuate slot 13b of the rear cover member 13. As a result, the arms 7b and 10b will be held in respective predetermined positions relative to the adapter ring 5.

However, when the first lens barrel means A is attached to the camera, the lock pin 16 will abut against a reference surface on the camera and thereby cause the pin 18 to be retracted against the spring 17 downwardly, as viewed in FIG. 4. As a result, the pin 18 will enter the hole 2a in order to be placed in a position permitting relative rotation between the adapter ring 5 and the other components of the first lens barrel means A, with the adapter ring 5 being held rotatably fixed relative to the camera by engagement of the projection 6 with a complementary element 39a in the camera.

The second lens barrel means B is structured to include a cylindrical member or lens barrel 20 having a bayonet holder ring 21 affixed thereto. The ring 21 carries the bayonet member 22 operative to couple the second lens barrel means B with the first lens barrel means A by coupling of the bayonet member 22 with the bayonet member 4 of the first lens barrel means A. A clutch ring 23 is fixedly mounted on the inner peripheral surface of the lens barrel 20 with the clutch ring 23 being formed as an annular member having mounted therewith a lock pin 24. The lock pin 24 is fitted in a stepped hole 23a formed in the clutch ring 23 and an elongated front end 24a of the pin 24 is adapted to engage in a notch 5e formed in the end surface of the adapter ring 5 of the first lens barrel means A. The opposite end 24b of the pin 24 is arranged to abut upon an end surface $26a_1$ of an arcuate wall 26a of a diaphragm setting ring 26, to be described more fully hereinafter. A second annular member or second adapter ring 27 of the second lens barrel means B is arranged to be rotatable relative to the bayonet holder ring 22. The second adapter ring 27 is formed with an attachment reference surface (not shown) adapted for abutment with the second bayonet member 4 of the first lens barrel means A. Additionally, a position fixing pin (not shown) for engagement with the first lens barrel means A is also provided on the adapter ring 27 whereby the ring 27 is held stationary relative to the first lens barrel means A during attachment thereto of the second lens barrel means B.

Furthermore, the adapter ring 27 and the bayonet holder ring 21 are formed with an interlocking mechanism therebetween which is similar to the interlocking mechanism depicted in FIG. 4 and previously described herein. When the second lens barrel means B is detached from the first lens barrel means A, the adapter ring 27 is held in a predetermined position relative to the bayonet holder ring 21 and the cylindrical member 20. As previously described, this predetermined position may be released by actuation of the interlocking mechanism of the second lens barrel means B which is structured in a manner similar to that depicted in FIG. 4.

The diaphragm setting ring 26 is rotatably fitted on the outer diameter of the cylindrical member 20 and is formed with a diaphragm value scale marked thereon. The arcuate wall 26a of the diaphragm setting ring 26 has an engagement portion $26a_2$ engageable with an arm 23b extending from the clutch ring 23. Furthermore, one end of the surface $26a_1$ of the arcuate wall 26a is formed with a groove $26a_3$ having a taper in the side surface thereof. The smaller diameter end 24b of the lock pin 24 is adapted to drop into the groove $26a_3$ when the second lens barrel means B is attached with the first lens barrel means A.

The lens assembly of the invention includes a diaphragm mechanism which is comprised of a diaphragm presetting ring 28 having a preset cam 28a, an arm 28b, and a latch 28c, with the presetting ring 28 being urged to rotate about the optical axis in a counterclockwise direction by means of a spring 29 tensioned between the ring 28 and the cylindrical member 20. A bell crank lever 30 is pivotally held on the cylindrical member 20 and a diaphragm actuating ring 31 is also rotatably held on the cylindrical member 20 urged by a spring 42 to rotate about the optical axis in a counterclockwise direction. An arm 31a is arranged to engage with the arm 10c of the actuating member 10. A diaphragm holder plate 32 is affixed to the cylindrical member 20 and defines an aperture 32a into which a rotation axis pin 33a of a diaphragm blade 33 is fitted. Another axis pin 33b of the diaphragm blade 33 is fitted in a cam hole 31b provided in the diaphragm actuating ring 31.

In the operation of the lens assembly in accordance with the present invention, when the first and second lens barrel means A and B are to be coupled with each other, position registering indices 34 and 35 provided on each, respectively, are aligned with each other. The second lens barrel means B may then be pressed against the first lens barrel means A by grasping at the cylindrical member 20 thereof and, as a result, the interlocking mechanism of the type depicted in FIG. 4 will be released to enable relative rotation between the second adapter ring 27 and the other parts of the second lens barrel means B. The second adapter ring 27 will be rotatively held in fixed engagement with the bayonet member 4 of the first lens barrel means A by engagement in a groove (not shown) formed in the second bayonet member 4 of a position determining pin (not shown) mounted on the second adapter ring 27. Thus, with the adapter ring 27 held stationary relative to the second bayonet member 4, the cylindrical member 20 of the second lens barrel means B may then be rotated thereby effecting relative rotation between the bayonet member 22 and the bayonet member 4 to effect locking engagement between the first and second lens barrel means.

When the indices 34 and 35 of the first and second lens barrel means A and B are in registry with each other, one end 24a of the lock pin 24 will drop in the notch 5e formed on the adapter ring 5. Then, by rotation of the second lens barrel means B, the end 24a of the lock pin 24 will ride over the tapered surface of the groove 5e and the opposite or small diameter end 24b will engage with the groove 26a₃ of the diaphragm setting ring 26. In this condition, the elongated end of the arm 31a of the diaphragm actuating ring 31 will engage with the arm 10c of the actuating member 10.

Figure 5:
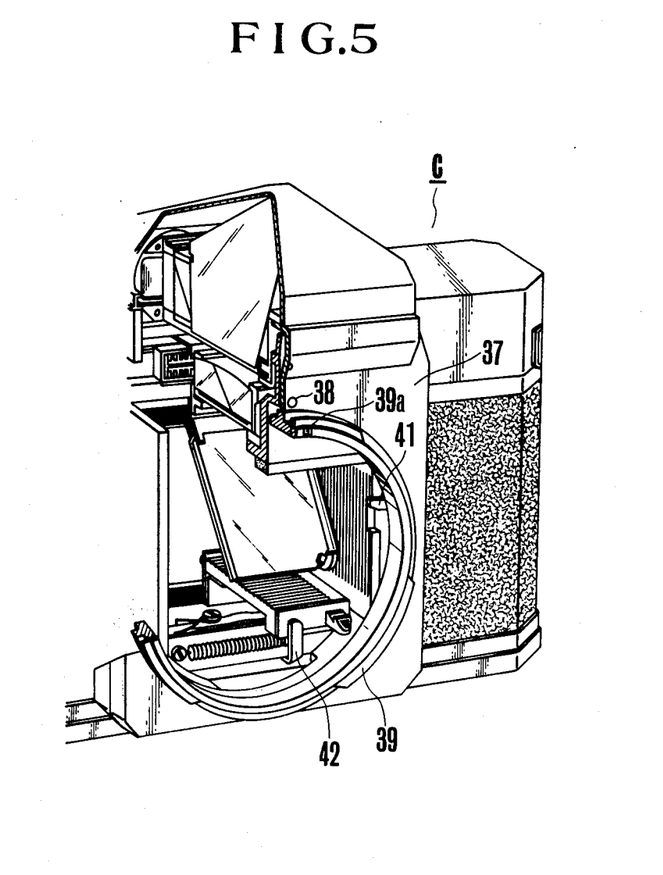
FIG. 5 is a partial perspective view showing a camera to which a lens assembly of the invention may be attached.

In the attachment operation of the first lens barrel means A with the camera body, and assuming that the second lens barrel means B has already been attached to the first lens barrel means A, the index 36 on the first lens barrel means A is brought into registry with the index 38 on the front panel of the camera housing (FIG. 5). As the position determining pin 6 enters the cutout 39a provided on the camera side bayonet member 39, the reference surface 5a of the adapter ring 5 will be brought into abutment with the camera side bayonet member 39. The engagement of the projection 6 into the cutout 39a will hold the adapter ring 5 rotatably fixed relative to the camera. The abutment of the reference surface 5a against the camera bayonet member 39 will cause the interlocking mechanism depicted in FIG. 4 to be released thereby permitting the components of the first lens barrel means A, other than the adapter ring 5, to be rotated relative to the camera in order that the bayonet member 3 may be brought into locking engagement with the camera bayonet member 39. During this tightening operation, the intermediate sleeve 14 rotates along with the first lens barrel 1 and the arm 7b of the signal transmitting member 7 becomes engaged with cooperating lever 41 in the camera, the intermediate sleeve 14 being rotated in the clockwise direction about the optical axis.

When the bayonet coupling has been completed between the first lens barrel means A and the camera body C, the diaphragm setting ring 26 and the clutch ring 23 will be connected with each other and the elongated portion 28b' of the arm of the diaphragm presetting ring will become engaged with the arm 7c of the signal transmitting member 7. At this time, the latch portion 28c of the diaphragm presetting ring 28 will no longer interfere with the cylindrical member 20, since it is retracted in the counterclockwise direction about the optical axis.

Then, when the diaphragm value scale of the diaphragm setting ring 26 is registered with the index 40 on the cylindrical member 20, the clutch ring 23 rotates along the diaphragm setting ring 26. Since the arm 28b is pressed against the end surface 23c' of the radial wall 23c of the clutch ring 23 by the spring 29, and since the elongated portion 28b' is in engagement with the arm 7c, the signal transmitting arm 7b will move in the arcuate slot 13a through a distance dependent upon the aperture value set on the diaphragm setting ring 26.

Figure 2:
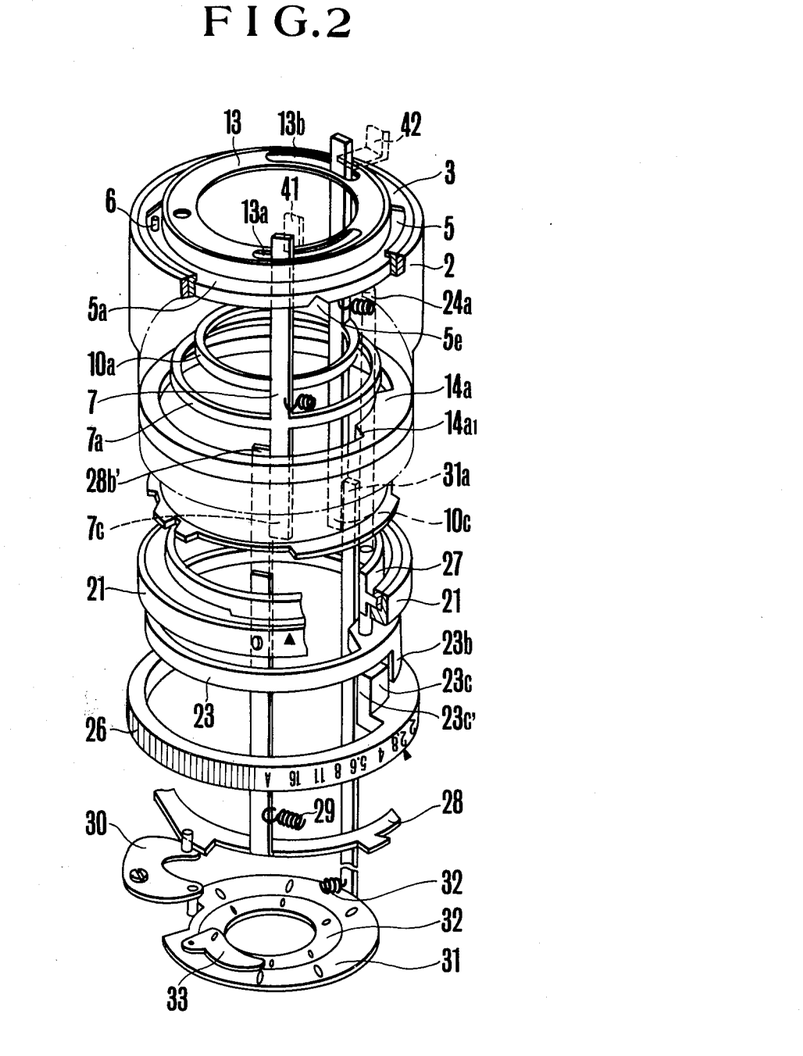
FIG. 2 is an exploded perspective view showing the lens assembly of the invention when attached to a camera body.

When the first lens barrel means A is attached with the camera body C, the arm 7b and the corresponding lever 41 in the camera are maintained in engagement with each other, as shown in FIG. 2. Therefore, when the diaphragm value scale of the diaphragm setting ring 26 is registered with the index 40, the arm 7b can be made movable from a starting point by a distance corresponding with the set diaphragm value. When the first lens barrel means A is attached with the camera C, the elongated arm 31a of the diaphragm actuating ring 31 is in engagement with the arm portion 10c of the actuating lever 10 and the elongated arm 10b of the actuating lever 10 is engaged with the actuating lever 42 in the camera body, as shown in FIGS. 2 and 5.

With the first lens barrel means A and the second lens barrel means B coupled together, and with the composite lens assembly then attached with the camera C in the working position, when a desired diaphragm value on the diaphragm setting ring 26 is registered with the index 40, the manual diaphragm value (Av value) is introduced through the elongated portion 28b' of the arm 28b and through the arm 7b and the corresponding lever 41 in the camera to an exposure control mechanism within the camera body. When actuation or release of the camera occurs, a release mechanism (not shown) of the type known in the art commences operation whereby the actuating lever 42 is rotated in a counterclockwise direction about the optical axis from a starting point shown in FIG. 2, and whereby the arm 10b of the actuating member 10 also rotates about the optical axis. This movement causes the arm 31a of the diaphragm actuating ring 31 to rotate in the counterclockwise direction about the optical axis as a result of the action of the spring 42. This rotation of the diaphragm actuating ring 31 results in closing down of the diaphragm blades to a corresponding aperture size determined by the set diaphragm value through movement of the diaphragm presetting ring 28 with its cam 28a and bell crank lever 30.

As indicated by the foregoing, the principal feature of the present invention relates to the fact that the interchangeable lens assembly is divided into two parts consisting of the first lens barrel means A and the second lens barrel means B. With this type of structure, a lens optical system which may include lens members $L_1-L_6$ may be located as desired either in the first lens barrel means A, as shown in FIG. 3(a), or in the first and second lens barrel means A and B, as shown in FIG. 3(b). Thus, versatility is improved and at least two types of lens mounting arrangements may be provided.

In the case of the type of lens mounting arrangement shown in FIG. 3(b), the combinations of less components $L_1-L_6$ and the selection of the optical system, for example the master lens in the rear or second lens barrel means B and an attachment lens in the front or first lens barrel means A may be enabled thereby leading to provision of a wide variety of lenses of different focal length and different relative apertures which may include, for example, wide angle, standard, and telephoto lenses.

In the case of the type of arrangement depicted in FIG. 3(a), where the lens optical system is located entirely in the front or first lens barrel means A, the rear or second lens barrel means B can be used as an intermediate tubular member. For example, a number of rear barrels of different axial length may be made available so that normal photography and closeup photography can be selectively performed with suitable selection of the various components of the lens assembly.

While specific embodiments of the invention have been shown and described in detail to illustrate the application of the inventive principles, it will be understood that the invention may be embodied otherwise without departing from such principles.

What is claimed is:

1. An interchangeable lens assembly for a camera comprising:
   (a) first lens barrel means including
      (a-1) first component means and first coupling means adapted to engage complementary coupling means on said camera for mounting said first lens barrel means on said camera,
      (a-2) second component means mounted with said first component means and arranged to be rotatable relative thereto, said first and second component means being held in predetermined position relative to each other when said first lens barrel means is detached from said camera,
      (a-3) signal transmission means including a signal transmission member for transmission of exposure control signals between said interchangeable lens assembly and said camera, and
      (a-4) retainer means adapted to cooperate with complementary retainer means on said camera to maintain said first component means rotatably fixed relative thereto during mounting of said lens barrel means on said camera;
   (b) second lens barrel means including
      (b-1) third component means and second coupling means adapted to engage complementary coupling means on said first lens barrel means for mounting said second lens barrel means on said first lens barrel means,
      (b-2) means for controlling the quantity of light entering said camera through said lens assembly,
      (b-3) exposure value setting means rotatably mounted on said second lens barrel means, and
      (b-4) connecting means for connecting said signal transmission means and said exposure value setting means.

2. An assembly according to claim 1 further comprising holding means for maintaining said first component means and said second component means in predetermined relative position.

3. An assembly according to claims 1 or 2 further comprising releasable locking means for locking said first lens barrel means and said second lens barrel means during a mounting operation of said second lens barrel means on said first lens barrel means.

4. An interchangeable lens assembly for a camera comprising:
   (a) first lens barrel means including
      (a-1) first component means and first coupling means adapted to engage complementary coupling means on said camera for mounting said first lens barrel means on said camera,
      (a-2) second component means mounted with said first component means and arranged to be rotatable relative thereto, said first and second component means being held in predetermined position relative to each other when said first lens barrel means is detached from said camera,
      (a-3) signal transmission means including a signal transmission member for transmission of exposure control signals between said interchangeable lens assembly and said camera,
      (a-4) retainer means adapted to cooperate with complementary retainer means on said camera to maintain said first component means rotatably fixed relative thereto during mounting of said first lens barrel means on said camera, and
      (a-5) driving power transmitting means having a transmitting member for transmitting driving power from said camera to said interchangeable lens assembly;
   (b) second lens barrel means including
      (b-1) third component means and second coupling means adapted to engage complementary coupling means on said first lens barrel means for mounting said second lens barrel means on said first lens barrel means,
      (b-2) fourth component means mounted with said third component means and arranged to be rotatable relative thereto, said third and fourth component means being held in predetermined position relative to each other when said second lens barrel means is detached from said first lens barrel means,
      (b-3) means for controlling the quantity of light entering said camera through said lens assembly, said light controlling means being connected with said driving power transmitting means when said second lens barrel means is coupled with said first lens barrel means and having a connecting member adapted to operatively engage said signal transmission member,
      (b-4) exposure value setting means rotatably mounted on said second lens barrel means, and
      (b-5) connecting means for connecting said signal transmission means and said light control means.

5. An assembly according to claims 1 or 4 further comprising second holding means for said signal transmission means for holding said signal transmission means in predetermined position relative to said second component means, said second holding means operating to release said holding position when said first lens barrel means is mounted on said camera.

6. An assembly according to claims 1 or 4 wherein said connecting means includes clutch means responsive to mounting operation of said second lens barrel means and said first lens barrel means for taking said signal transmission means out of engagement with said second component means and for bringing said signal transmission means into engagement with said exposure value setting means.

* * * * *